United States Patent
Douglas et al.

(10) Patent No.: US 9,542,250 B2
(45) Date of Patent: Jan. 10, 2017

(54) DISTRIBUTED MAINTENANCE MODE CONTROL

(75) Inventors: Clinton Douglas, Charlotte, NC (US); Todd D. Robinson, Frederick, CO (US)

(73) Assignee: International Business Machines Corporation, Armonk, NY (US)

( * ) Notice: Subject to any disclaimer, the term of this patent is extended or adjusted under 35 U.S.C. 154(b) by 89 days.

(21) Appl. No.: 13/606,263

(22) Filed: Sep. 7, 2012

(65) Prior Publication Data

US 2014/0075008 A1    Mar. 13, 2014

(51) Int. Cl.
*G06F 11/07* (2006.01)
*G06F 11/30* (2006.01)

(52) U.S. Cl.
CPC ....... *G06F 11/0709* (2013.01); *G06F 11/0778* (2013.01); *G06F 11/0784* (2013.01); *G06F 11/3079* (2013.01); *G06F 11/3055* (2013.01)

(58) Field of Classification Search
CPC .... H04L 43/04; H04L 43/10; H04L 29/08099; H04L 41/00; H04L 43/08; H04L 43/0805; H04L 43/12
USPC .......................... 709/203, 217, 219, 223, 224
See application file for complete search history.

(56) References Cited

U.S. PATENT DOCUMENTS

| | | | |
|---|---|---|---|
| 7,647,391 B1* | 1/2010 | Jean ................. | G06Q 10/06311 705/1.1 |
| 7,898,939 B2 | 3/2011 | Lee et al. | |
| 8,727,207 B1* | 5/2014 | Church .......................... | 235/33 |
| 2001/0007979 A1* | 7/2001 | Teshima ................. | G06Q 10/08 705/23 |
| 2002/0016745 A1* | 2/2002 | Kuwahara .............. | G06Q 20/02 705/26.81 |
| 2002/0059412 A1* | 5/2002 | Azpitarte ....................... | 709/223 |
| 2002/0087680 A1* | 7/2002 | Cerami ................ | G06Q 10/087 709/224 |
| 2002/0194319 A1* | 12/2002 | Ritche ................. | H04L 41/0631 709/223 |
| 2006/0143698 A1* | 6/2006 | Ohara .................. | G06Q 20/045 726/10 |
| 2006/0220845 A1* | 10/2006 | Agrawal ................. | G07F 9/026 340/545.1 |
| 2009/0106421 A1* | 4/2009 | Kronenberg et al. ......... | 709/224 |
| 2012/0173668 A1* | 7/2012 | Ogata ..................... | H04B 7/08 709/217 |
| 2012/0173688 A1* | 7/2012 | True et al. .................... | 709/223 |

* cited by examiner

*Primary Examiner* — Barbara Burgess
(74) *Attorney, Agent, or Firm* — Weitzman Law Offices, LLC

(57) ABSTRACT

A distributed maintenance mode system and method includes receiving an indicator that a monitored system has entered maintenance mode. Trap data is received for the monitored system. It is determined whether the monitored system is in maintenance mode based on the indicator. The trap data is stored and a billable incident ticket is generated for the monitored system if it is determined that the monitored system is not in maintenance mode. The trap data is stored and no billable incident ticket is generated for the monitored system if it is determined that the monitored system is in maintenance mode.

20 Claims, 6 Drawing Sheets

| SERVER | COMPONENT | ALERT TYPE | MAINTENANCE | INITIATOR | START | END |
|---|---|---|---|---|---|---|
| Server A | N/A | N/A | NO | N/A | N/A | N/A |
| Server B | N/A | N/A | YES | J. Watson | 3:30PM 8/1/2009 | 7:00PM 8/1/2009 |
| Server C | CPU | N/A | YES | R. Smith | 4:00PM 8/3/2009 | N/A |
| Server D | CPU | Bandwidth Throttling | YES | J. Watson | 2:15PM 8/2/2009 | N/A |
| Server E | Memory | Memory Limit | YES | J. Jones | 12:20AM 8/2/2009 | 9:00AM 8/3/2009 |
| Server F | Memory | Memory Limit | YES | J. Jones | 12:20AM 8/2/2009 | 9:00AM 8/3/2009 |
| Server G | Memory | Memory Limit | YES | J. Jones | 12:20AM 8/2/2009 | 9:00AM 8/3/2009 |
| Server H | Memory | Memory Limit | YES | J. Jones | 12:20AM 8/2/2009 | 9:00AM 8/3/2009 |

FIG. 6

DISTRIBUTED MAINTENANCE MODE CONTROL

BACKGROUND

1. Field

This disclosure relates generally to data processing and apparatuses for updating, and, more particularly, to managing updating of software, including multiple files.

2. Background

Administration of computer systems involves detecting and addressing software and hardware faults. Software and hardware faults may be detected by the generation of trouble "tickets," which are generated in response to "trap" data that is transmitted from a monitored computer system. The trap data is sent to a ticket-generating system that analyzes the trap data. If the trap data indicates that a fault has occurred, a trouble ticket is generated and sent to the appropriate party. Trap data does not universally require the generation of a trouble ticket. Systems and processes may be placed in special modes of functionality that continue to generate trap data, wherein no fault has actually occurred.

BRIEF SUMMARY

In one aspect of this disclosure, a distributed maintenance mode method is disclosed, comprising receiving an indicator that a monitored system has entered maintenance mode. Trap data is received for the monitored system. It is determined whether the monitored system is in maintenance mode based on the indicator. The trap data is stored and a billable incident ticket is generated for the monitored system if it is determined that the monitored system is not in maintenance mode. The trap data is stored and no billable incident ticket is generated for the monitored system if it is determined that the monitored system is in maintenance mode.

In another aspect of this disclosure, a distributed maintenance mode system is disclosed, comprising a computer processor and computer memory, the computer memory comprising program instructions that, when executed, cause the computer processor to receive an indicator that a monitored system has entered maintenance mode, receive trap data for the monitored system, determine whether the monitored system is in maintenance mode based on the indicator, store the trap data and generate a billable incident ticket for the monitored system if it is determined that the monitored system is not in maintenance mode, and store the trap data and generate no billable incident ticket for the monitored system if it is determined that the monitored system is in maintenance mode.

The foregoing has outlined rather generally the features and technical advantages of one or more embodiments of this disclosure in order that the following detailed description may be better understood. Additional features and advantages of this disclosure will be described hereinafter, which may form the subject of the claims of this application.

BRIEF DESCRIPTION OF THE DRAWINGS

This disclosure is further described in the detailed description that follows, with reference to the drawings, in which:

FIG. 6 illustrates an exemplary information display for distributed maintenance mode control.

DETAILED DESCRIPTION

Computer systems are often fully or partially disabled for periodic maintenance. However, these systems may continue to generate trap data, some of which may be interpreted as indicating a fault, due to the stoppage or interference maintenance mode may have with normal operation. This extra trap data may then erroneously generate new trouble tickets. These trouble tickets must then be filtered out from the pool of legitimate trouble tickets, which is often done manually.

This lack of control over trap data generation and trouble ticket generation creates a serious business problem, because the issue impacts the costs of computer system administration. Customers are generally billed based on the number of tickets generated over a period of time, so the generation of extraneous trouble tickets may cost customers if these extraneous trouble tickets are not properly filtered out of the pool of legitimate trouble tickets. Similarly, the burden of filtering out extraneous trouble tickets drives expenditure for system administrators, increasing labor costs and requiring the use of network and server resources. Current solutions include manually disabling monitoring agents, trap data sources or trouble ticket generation infrastructure; or having support teams ignore or close out extraneous trouble tickets as non-billable. The former has significant drawbacks. Shutting down these vital components renders administrators unable to monitor other components of the system, effectively creating an outage in the monitoring and ticketing infrastructure. Similarly, it may expose customers to the administrator's inability to automatically sort out non-billable trouble tickets, impinging the reputation of the system administrator.

This application discloses a system and method for distributed maintenance mode control. The distributed maintenance mode control provides a mechanism to place a monitored system or component of a monitored system into a maintenance mode. This is preferably done at the point in which trap data is collected and trouble tickets are generated. Once a system has been placed in a maintenance state, trap data received related to the system is ignored for the purposes of trouble ticket generation. Advantageously, this avoids the need for manual filtration of extraneous trouble tickets, without sacrificing continuous monitoring of the system or other systems and subcomponents. It also provides continued historical data reporting on trap data that was received during the maintenance state. Monitoring agents can still operate and collect performance and historical data.

Figure 1:
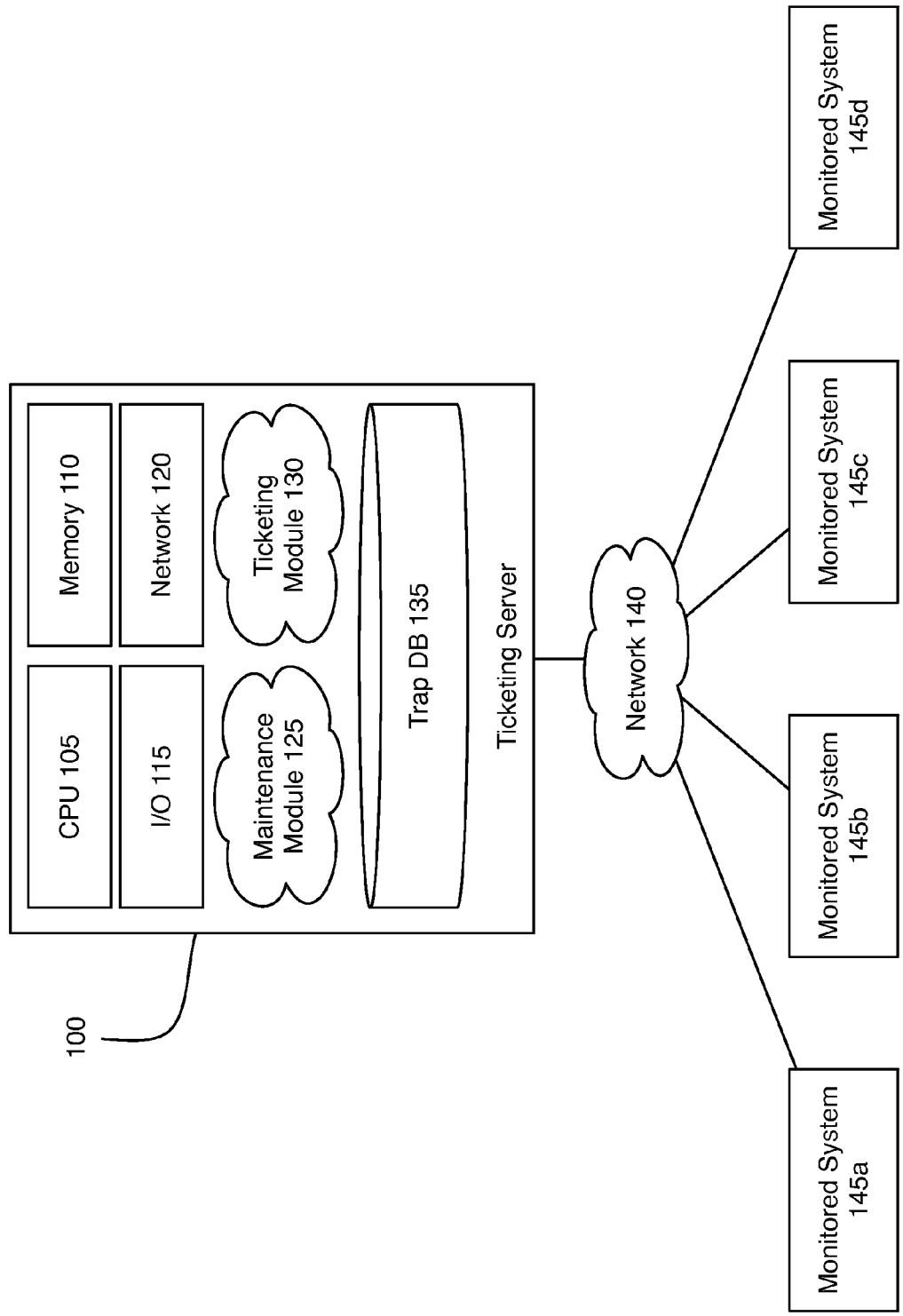
FIG. 1 is a high level representation of an illustrative distributed maintenance mode control module operating on a ticketing server.

FIG. 1 is a high level representation of an illustrative distributed maintenance mode control module 125 operating on a ticketing server 100. The ticketing server 100 is responsible for receiving trap data received from a number of monitored systems 145a-145d through network 140, and generating incident trouble tickets in response to the received trap data. The ticketing server 100 has a central processing unit 105, memory device 110, input/output device 115 and network device 120. The central processing unit 105 receives and processes program instructions. The memory device 110 may be used to store program instructions and/or data, and may represent, for example, drives and other forms of more permanent storage, or random access memory used by the central processing unit 105. The input/output device 115 may be used to receive information from an operator of the ticketing server 100, and display information to the operator of the ticketing server 100. The input/output device 115 may therefore represent devices such as a keyboard, mouse, pointer device, display monitors, etc. The network device 120 may provide a network connection to network 140.

The maintenance module 125 implements distributed maintenance mode control via the maintenance module 125. The maintenance module 125 may be a software process operating on the ticketing server in conjunction with the ticketing module 130, which is responsible for receiving trap data and generating trouble tickets based on the trap data. The maintenance module 125 and ticketing module 130 may be portions of a single software process, or be implemented as distinct software processes. The maintenance module 125 and ticketing module 130 may similar be implemented on the same server (as depicted), or operate on separate but communicatively coupled servers. A trap data database 135 may store trap data received from the monitored systems 145a-145d. The trap data database 135 may be implemented on a separate storage device distinct from the memory device 110, or be implemented within the memory device 110.

Figure 2:
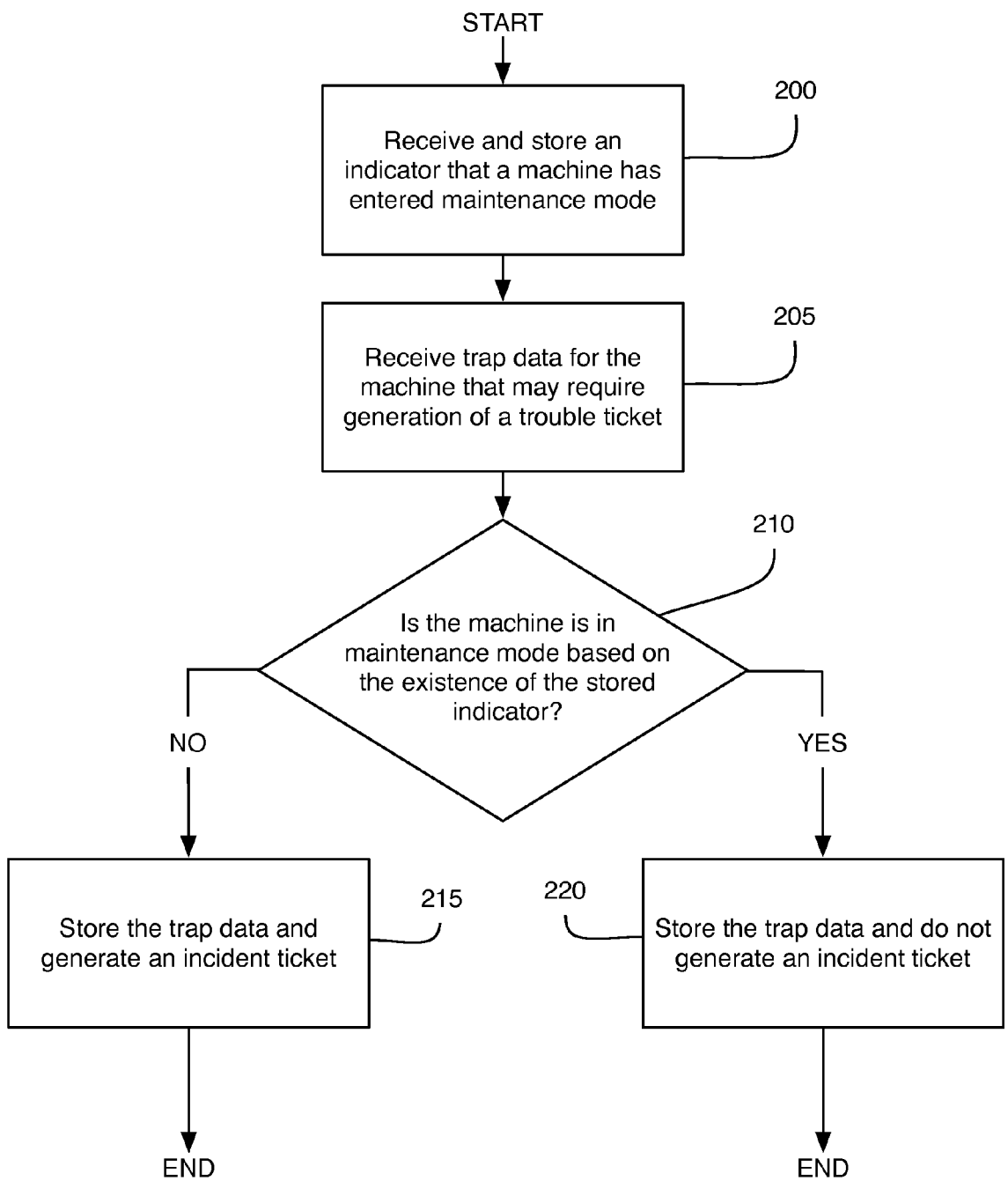
FIG. 2 illustrates an exemplary sequence of steps for implementing distributed maintenance mode control.

FIG. 2 illustrates an exemplary sequence of steps for implementing distributed maintenance mode control. The ticketing server 100 receives an indicator through network 140 that one of the monitored servers 145a-145d has entered maintenance mode (step 200). The indicator may be received by an administrator's manual command. For example, an operator who knows of an impending maintenance operation, or wishes to schedule one, may trigger maintenance mode for the single affected monitored server 145a-145d. Alternatively, maintenance mode may be triggered via a scheduler, in which an operator describes the future period of time in which the single monitored server 145a-145d will be in maintenance mode. When the start time of the future period matches the current time, the ticketing server 100 may automatically place the single monitored server 145a-145d in maintenance mode.

The ticketing server 100 then receives trap data for the affected monitored server 145a-145d through network 140 (step 205). The ticketing server 100 may then determine whether the affected monitored server 145a-145d is in maintenance mode (step 210). If the affected server 145a-145d is not in maintenance mode, then the trap data is stored in the trap data database 135, and a trouble ticket is generated by the ticketing module 130 based on the trap data (step 215). If the affected server 145a-145d is in maintenance mode, then the trap data is stored in the trap data database 135, and no trouble ticket is generated (step 220).

Figure 3:
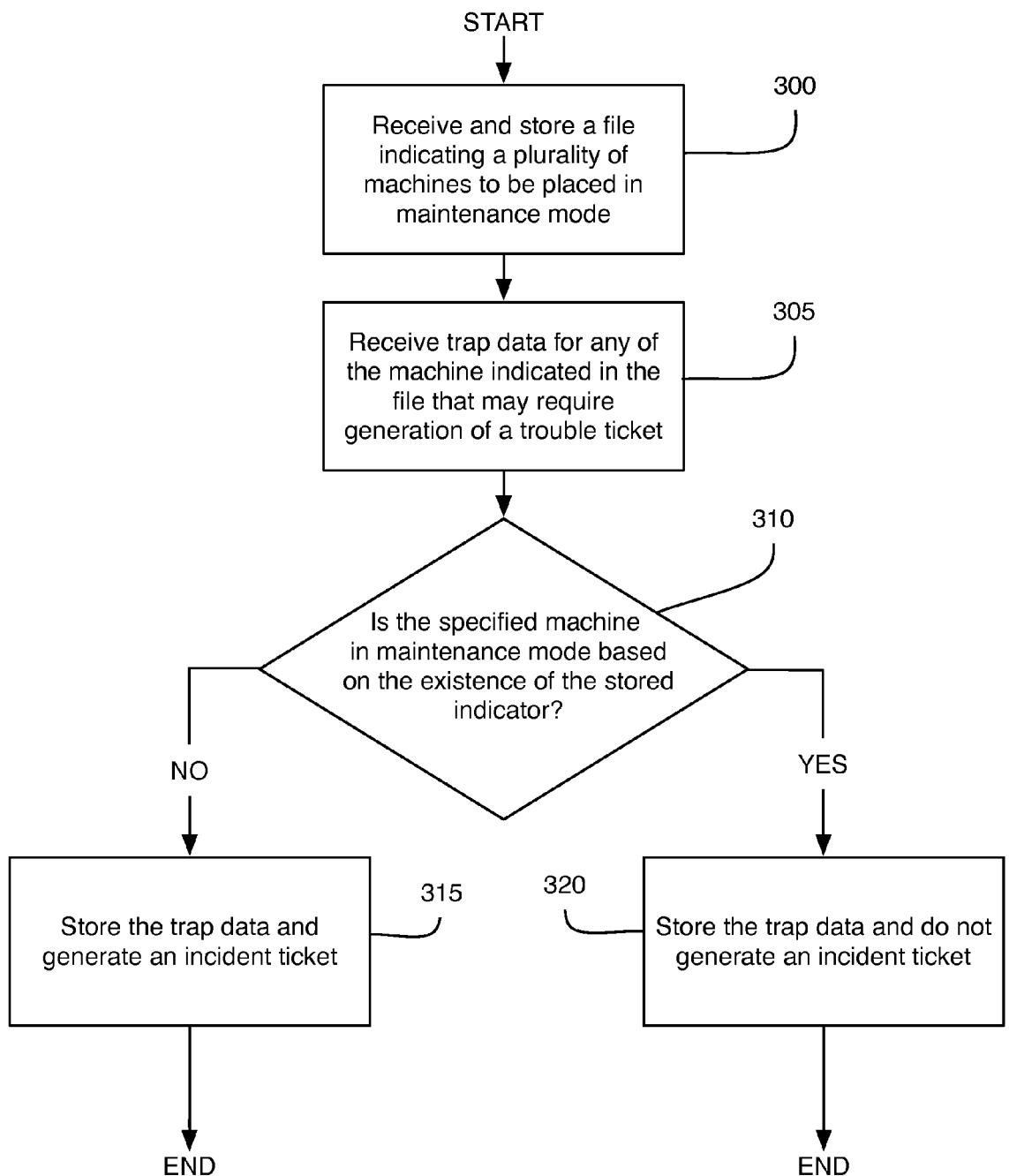
FIG. 3 illustrates an exemplary sequence of steps for implementing a variation of distributed maintenance mode control.

FIG. 3 illustrates an exemplary sequence of steps for implementing a variation of distributed maintenance mode control, in which multiple monitored servers 145a-145d may be placed in maintenance mode simultaneously. For example, a network router supporting multiple systems may be placed offline for maintenance purposes. Trap data indicating that the plurality of affected systems is offline should be ignored for the purposes of trouble ticket generation. Due to the potentially large number of affected systems, it would be tedious to individually place each individual affected system in maintenance mode. Therefore, the ability to place multiple systems in maintenance mode simultaneously is highly advantageous in this context. The ticketing server 100 receives an indicator that a number of monitored servers 145a-145d should be placed in maintenance mode (step 300). The indicator may take the form of a file listing the requisite identifiers for the affected monitored servers 145a-145d. Other formats may be utilized as desired. The ticketing server 100 then receives trap data relating to one or more of the affected monitored servers 145a-145d (step 305). The ticketing server 100 determines whether the monitored server or servers related to the trap data is in maintenance mode (step 310). If the affected server or servers 145a-145d is not in maintenance mode, then the trap data is stored in the trap data database 135, and a trouble ticket is generated based on the trap data (step 315). If the affected server or servers 145a-145d is in maintenance mode, then the trap data is stored in the trap data database 135, and no trouble ticket is generated (step 320).

Figure 4:
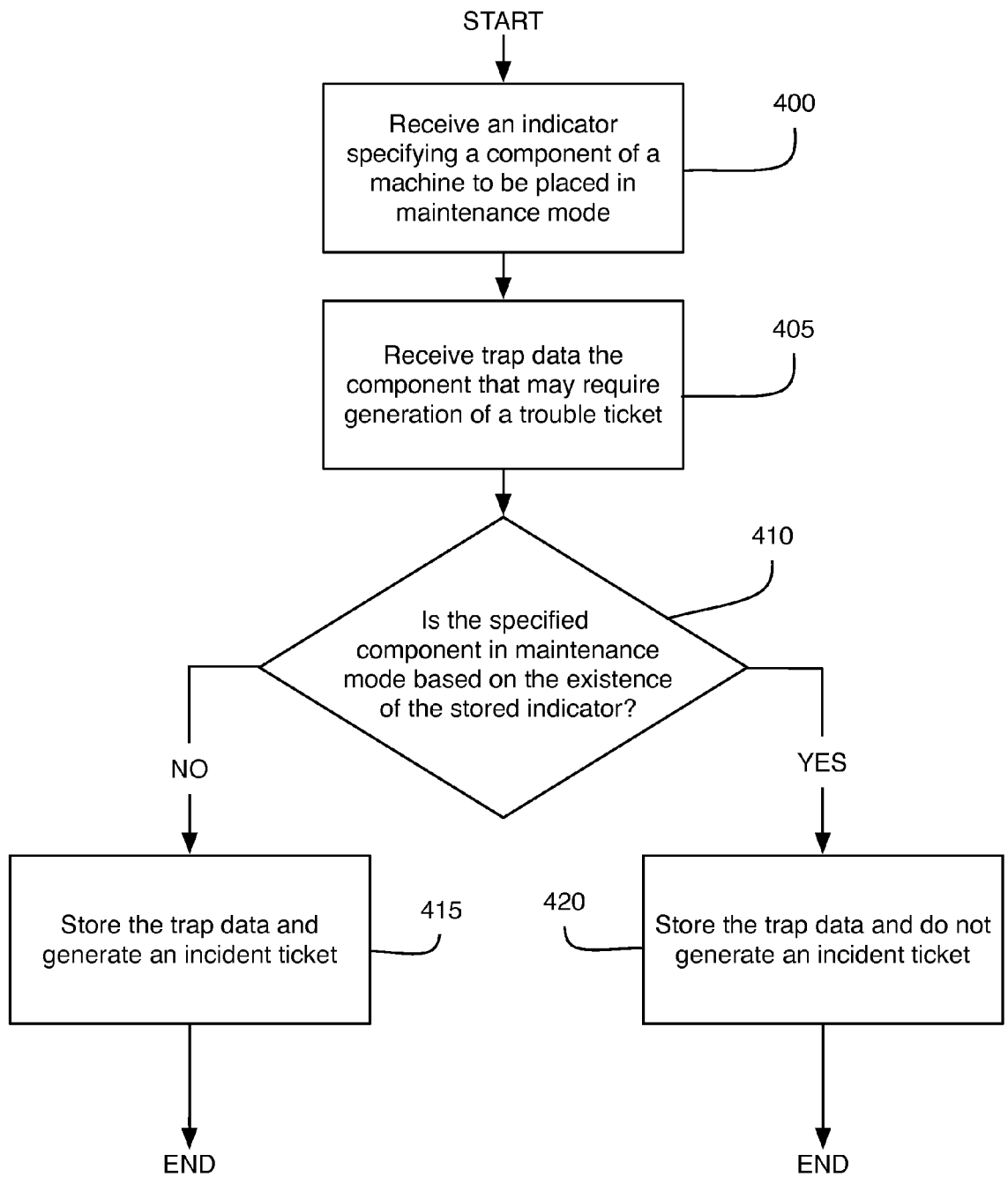
FIG. 4 illustrates an exemplary sequence of steps for implementing a variation of distributed maintenance mode control.

FIG. 4 illustrates an exemplary sequence of steps for implementing a variation of distributed maintenance mode control, in which individual components of servers may be placed in maintenance mode, as opposed to the whole system. It may be desirable to place individual components in maintenance mode if an operator knows that some maintenance operation may affect the performance of a system component, and that the affected performance is liable to generate trouble tickets. The ticketing server 100 may receive an indicator specifying that a specific component of a monitored server 145a-145d should be placed in maintenance mode (step 400). Specific components may include logically distinct systems within a computer server, such as the central processing unit, main memory, the computer bus, etc. The ticketing server 100 then receives trap data related to the component (step 405). The ticketing server determines whether the component is in maintenance mode (step 410). If the affected component is not in maintenance mode, then the trap data is stored in the trap data database 135, and a trouble ticket is generated based on the trap data (step 415). If the affected component is in maintenance mode, then the trap data is stored in the trap data database 135, and no trouble ticket is generated (step 420).

Figure 5:
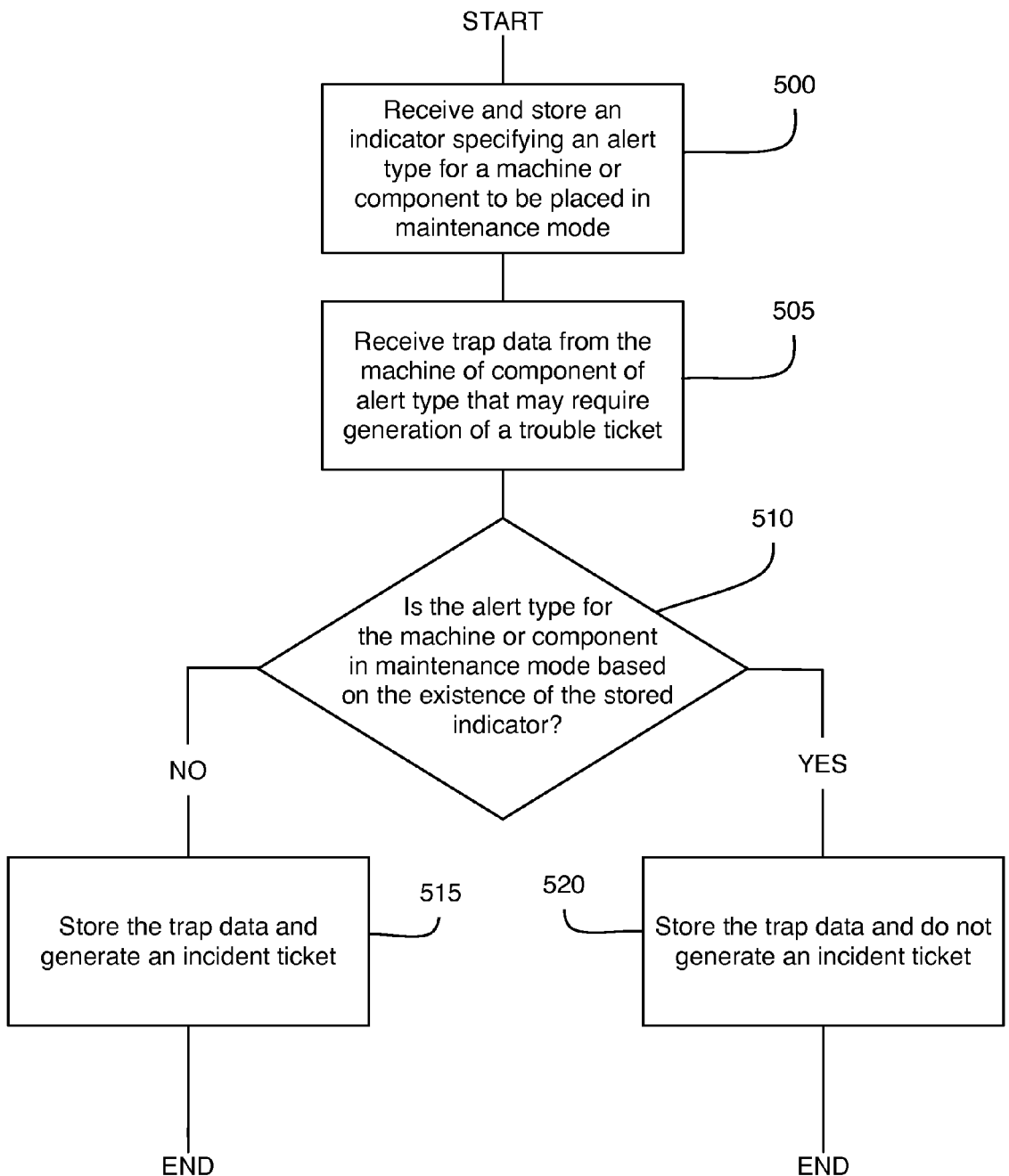
FIG. 5 illustrates an exemplary sequence of steps for implementing a variation of distributed maintenance mode control.

FIG. 5 illustrates an exemplary sequence of steps for implementing a variation of distributed maintenance mode control, wherein a particular alert type is placed in maintenance mode. An operator may know that a particular system or component will be affected by some operation for a period of time. For example, a central processing unit on an affected server may experience some throttling of processor speed for a time. Placing the entire central processing unit in maintenance mode may miss crucial trap data related to other performance aspects of the central processing unit. Instead, trap data related only to the throttling of processor speed may be ignored. The ticketing server 100 may receive an indicator specifying that a specific alert type (such as processor speed throttling) of a monitored server 145a-145d should be placed in maintenance mode (step 500). When the ticketing server 100 then receives trap data for the specified component or system of the appropriate alert type (step 505), the ticketing server determines whether the alert type is in maintenance mode (step 510). If the affected alert type is not in maintenance mode, then the trap data is stored in the trap data database 135, and a trouble ticket is generated based on the trap data (step 515). If the affected alert type is in maintenance mode, then the trap data is stored in the trap data database 135, and no trouble ticket is generated (step 520).

FIG. 6 illustrates an exemplary information display table for distributed maintenance mode control. A plurality of data may be displayed to operators of the ticketing server 100. Information may be retrieved from stored maintenance mode indicators or from received trap data. The information may be displayed as, for example, a table. Column 605 may display a list of systems or servers 145a-145d that are currently being monitored by the ticketing server 100. If the monitored servers 145a-145d in column 605 are being monitored for a particular component (as described above), the component may be listed in column 610. Similarly, if the monitored servers 145a-145d in column 605 are being monitored for a particular alert type (which may be tied to a component), the alert type may be listed in column 615. Column 620 may designate whether the monitored server 145a-145d is currently in maintenance mode. Column 625 may list the initiator of the maintenance mode for each particular monitored server 145a-145d. This information may be obtained, for example, from the indicator. Finally, column 630 may list the start time of the maintenance mode for each monitored server 145a-145d. Some of these start times may be in the future, indicating that maintenance mode is scheduled for a future block of time. Column 635 may list the end time of the maintenance mode for each monitored server 145a-145d. Notably, the end time may be listed as blank or "not applicable," indicating that the maintenance mode will continue indefinitely, until an operator disables it manually.

Aspects of the present invention have been described with respect to block diagrams and/or flowchart illustrations of methods, apparatus (system), and computer program products according to embodiments of the invention. It will be understood that each block of the flowchart illustrations and/or block diagrams, and combinations of blocks in the flowchart illustrations and/or block diagrams, can be implemented by computer instructions. These computer instructions may be provided to a processor of a general purpose computer, special purpose computer, or other programmable data processing apparatus to produce a machine, such that instructions, which execute via the processor of the computer or other programmable data processing apparatus, create means for implementing the functions/acts specified in the flowchart and/or block diagram block or blocks.

The aforementioned programs can be written in any combination of one or more programming languages, including low-level, high-level, object-oriented or non object-oriented languages, such as Java, Smalltalk, C, and C++. The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware (not shown).

The foregoing description of various embodiments of the present invention has been presented for purposes of illustration and description. It is not intended to be exhaustive nor to limit the invention to the precise form disclosed. Many modifications and variations are possible. Such modifications and variations that may be apparent to a person skilled in the art of the invention are intended to be included within the scope of the invention as defined by the appended claims.

What is claimed is:

1. A distributed maintenance mode system, comprising:
a computer processor;
computer memory, the computer memory comprising program instructions that, when executed, cause the computer processor to:
monitor a plurality of distributed systems;
receive an indicator that indicates whether or not a monitored system of the plurality of distributed systems has entered maintenance mode;
receive trap data for the monitored system the received trap data being indicative of a fault involving the monitored system;
determine, based on the received indicator, whether or not the monitored system is in maintenance mode;
store the trap data and generate a billable trouble ticket for the fault involving the monitored system if a result of the determination is that the monitored system is not in maintenance mode; and
if the received indicator indicates that the monitored system is in maintenance mode, store the trap data and otherwise ignore the trap data such that a trouble ticket, resulting from the received trap data, is not generated for the monitored system because the monitored system is in maintenance mode.

2. The system of claim 1, wherein the indicator is an indicator file, the indicator file identifying whether or not at least an additional monitored system of the plurality of distributed monitored systems is also in maintenance mode, and wherein the program instructions, when executed, further cause the computer processor to:
receive trap data for at least one of the monitored system or additional monitored system of the plurality of monitored systems;
determine, based on the indicator file, whether the received trap data is from the additional monitored system and that the additional monitored system is in maintenance mode;
store the trap data and otherwise ignore the trap data such that a trouble ticket resulting from the received trap data is not generated for the additional monitored system of the plurality of monitored systems because the additional monitored system is in maintenance mode.

3. The system of claim 1, wherein the indicator further delineates a component of the monitored system, and wherein the program instructions, when executed, further cause the computer processor to:
receive trap data for the monitored system pertaining to the component;
determine whether or not the component is in maintenance mode based on the indicator;
store the trap data and generate a trouble ticket for the component if the component is not in maintenance mode; and
if the component is in maintenance mode, store the trap data and otherwise ignore the trap data such that a trouble ticket for the component, resulting from the received trap data, is not generated because the component if it is determined that the monitored system component is in maintenance mode.

4. The system of claim 3, wherein the indicator delineates at least one activity of the component, and wherein the program instructions, when executed, further cause the computer processor to:
- receive trap data pertaining to the activity as performed by the component;
- determine whether or not the received trap data pertaining to the activity corresponds to the activity specified by the indicator; and either
- store the trap data and generate a trouble ticket for the component activity if the received trap data pertaining to the activity does not correspond to the at least one activity of the component; or
- store the trap data and otherwise ignore the trap data such that a trouble ticket for the monitored system component activity will not be generated.

5. The system of claim 1, wherein the indicator delineates a specific type of activity.

6. The system of claim 1, wherein the indicator is created by a scheduler designating a span of time in which the monitored system is to be in maintenance mode.

7. The system of claim 6, wherein the span of time is set at a future time.

8. The system of claim 1, wherein the indicator is generated immediately in response to an input by a user.

9. The system of claim 1, wherein the program instructions, when executed, further cause the computer processor to:
- display a list of particular monitored systems of the plurality of distributed monitored systems that are in maintenance mode.

10. The system of claim 9, wherein the program instructions, when executed, further cause the computer processor to:
- display, for each monitored system in the list, at least an identity of a maintenance mode initiator and a maintenance mode time.

11. A distributed maintenance mode method, comprising:
- monitoring a plurality of distributed systems;
- receiving, using a computer processor, an indicator that indicates whether or not a monitored system of the plurality of distributed systems has entered maintenance mode;
- receiving, using the computer processor, trap data for the monitored system, the received trap data being indicative of a fault involving the monitored system;
- determining, using the computer processor and based upon the received indicator, whether or not the monitored system is in maintenance mode;
- storing, in computer memory, the trap data and generating, using the computer processor, a trouble ticket for the fault involving the monitored system if a result of the determining is that the monitored system is not in maintenance mode; and
- if the received indicator indicates that the monitored system is in maintenance mode storing, using the computer memory, the trap data and otherwise ignore the trap data such that a trouble ticket for the monitored system resulting from the trap data is not generated because the monitored system is in maintenance mode.

12. The method of claim 11, wherein the indicator is an indicator file, the method further comprising:
- identifying, using the computer processor, whether or not at least an additional monitored system of the plurality of distributed systems is also in maintenance mode;
- receiving, using the computer processor, trap data for at least one of the monitored system or additional monitored system of the plurality of monitored systems;
- determining, using the computer processor and based on the indicator file, whether the received trap data is from the additional monitored system and that the additional monitored system is in maintenance mode;
- storing, in the computer memory, the trap data and generating, using the computer processor, a trouble ticket, for whichever of the monitored system or additional monitored system the received trap data applies, if such system is not in maintenance mode; and
- storing, in the computer memory, the trap data while ignoring the trap data for whichever of the monitored system or additional monitored system the received trap data applies such that a trouble ticket will not be generated, if such system is in maintenance mode.

13. The method of claim 11, wherein the indicator delineates a component of the monitored system, the method further comprising:
- receiving, in the computer memory, trap data for the monitored system pertaining to the component;
- determining, using the computer processor, whether or not the component is in maintenance mode based on the indicator;
- storing, in the computer memory, the trap data and generating, using the computer processor, a trouble ticket for the component if the component is not in maintenance mode; and
- if the component is in maintenance mode, storing, in the computer memory, the trap data while otherwise ignoring the trap data such that the trouble ticket for the component will not be generated because the component is in maintenance mode.

14. The method of claim 13, wherein the indicator delineates at least one activity of the component, the method further comprising:
- receiving, using the computer processor, trap data pertaining to the activity as performed by the component;
- determining, using the computer processor, whether or not the received trap data pertaining to the activity corresponds to the activity specified by the indicator; and either
- storing, in the computer memory, the trap data and generating, using the computer processor, a trouble ticket for the component activity if the received trap data pertaining to the activity does not correspond to the component; or
- storing, in the computer memory, the trap data and otherwise ignoring the trap data such that a trouble ticket for the monitored system component activity will not be generated.

15. The method of claim 11, wherein the indicator delineates a specific type of activity.

16. The method of claim 11, wherein the indicator is created by a scheduler designating a span of time in which the monitored system is to be in maintenance mode.

17. The method of claim 16, wherein the span of time is set at a future time.

18. The method of claim 11, wherein the indicator is generated immediately in response to an input by a user.

19. The method of claim 11, further comprising:
- displaying, using the computer processor, a list of particular monitored systems of the plurality of distributed systems that are in maintenance mode.

20. The method of claim 19, the method further comprising:

displaying, using the computer processor, for each particular monitored system in the list, at least a maintenance mode initiator identity, and a maintenance mode time.

\* \* \* \* \*